United States Patent
Shavro (10) Patent No.: US 11,030,318 B1
(45) Date of Patent: Jun. 8, 2021

(54) INTERACTIVE VERIFICATION OF SECURITY VULNERABILITY DETECTIONS USING RUNTIME APPLICATION TRAFFIC

(71) Applicant: Synopsys, Inc., Mountain View, CA (US)

(72) Inventor: Tamir Shavro, Hertzelia (IL)

(73) Assignee: Synopsys, Inc., Mountain View, CA (US)

( * ) Notice: Subject to any disclaimer, the term of this patent is extended or adjusted under 35 U.S.C. 154(b) by 651 days.

(21) Appl. No.: 15/887,900

(22) Filed: Feb. 2, 2018

Related U.S. Application Data (60) Provisional application No. 62/455,531, filed on Feb. 6, 2017, provisional application No. 62/454,640, filed on Feb. 3, 2017.

(51) Int. Cl.
| | | |
|---|---|---|
| *G06F 21/62* | (2013.01) | |
| *G06F 21/57* | (2013.01) | |
| *G06F 11/36* | (2006.01) | |
| *H04L 29/06* | (2006.01) | |
| *G06F 21/52* | (2013.01) | |
| *H04L 29/08* | (2006.01) | |

(52) U.S. Cl.
CPC ........ *G06F 21/577* (2013.01); *G06F 11/3612* (2013.01); *G06F 11/3668* (2013.01); *G06F 21/52* (2013.01); *H04L 63/1433* (2013.01); *G06F 2221/033* (2013.01); *H04L 67/02* (2013.01)

(58) Field of Classification Search
CPC .... G06F 21/577; G06F 21/52; G06F 11/3612; G06F 11/3668; G06F 21/62; G06F 2221/033; H04L 63/1433; H04L 67/02
See application file for complete search history.

(56) References Cited

U.S. PATENT DOCUMENTS

| | | | | |
|---|---|---|---|---|
| 7,028,225 | B2 * | 4/2006 | Maso | G06F 11/3438 |
| | | | | 702/186 |
| 8,468,602 | B2 * | 6/2013 | McDougal | G06F 21/562 |
| | | | | 726/23 |
| 8,726,394 | B2 | 5/2014 | Maor et al. | |
| 9,043,924 | B2 * | 5/2015 | Maor | G06F 11/3688 |
| | | | | 726/25 |
| 2002/0016920 | A1 * | 2/2002 | Komura | G06Q 10/10 |
| | | | | 726/26 |
| 2011/0112597 | A1 * | 5/2011 | Snell | A61N 1/37235 |
| | | | | 607/27 |
| 2014/0047545 | A1 * | 2/2014 | Sidagni | G06F 21/577 |
| | | | | 726/25 |
| 2014/0380474 | A1 * | 12/2014 | Paithane | B01D 61/022 |
| | | | | 726/23 |

(Continued)

*Primary Examiner* — Farid Homayounmehr
*Assistant Examiner* — Sanchit K Sarker
(74) *Attorney, Agent, or Firm* — Fenwick & West LLP (57) ABSTRACT

An application service request is parsed to identify an application service request parameter of the application service request. The application service request parameter is altered. The application service request is reconstructed to include the altered application service request parameter. The behavior of the application is analyzed while executing the reconstructed application service request to detect a security vulnerability. The detection of the security vulnerability is verified to eliminate false positives.

18 Claims, 3 Drawing Sheets

(56) References Cited

U.S. PATENT DOCUMENTS

| | | | | |
|---|---|---|---|---|
| 2015/0101057 A1* | 4/2015 | Fingold | ............... | H04L 63/1433 |
| | | | | 726/25 |
| 2016/0259943 A1* | 9/2016 | Murthy | ................. | G06F 21/577 |
| 2016/0335110 A1* | 11/2016 | Paithane | ................. | G06F 21/53 |
| 2018/0102039 A1* | 4/2018 | Furuland | ............... | A61B 5/1118 |

* cited by examiner

INTERACTIVE VERIFICATION OF SECURITY VULNERABILITY DETECTIONS USING RUNTIME APPLICATION TRAFFIC

CROSS REFERENCE TO RELATED APPLICATION

This application claims the benefit of U.S. Provisional Applications No. 62/454,640, filed Feb. 3, 2017 and No. 62/455,531, filed Feb. 6, 2017, both of which are incorporated by reference in their entirety.

BACKGROUND

Field of the Disclosure

The present disclosure generally relates to security testing of software using runtime analysis, and specifically to interactive verification of security vulnerability detections using runtime application traffic.

Description of the Related Arts

Detecting and verifying security vulnerabilities is typically a slow, costly, and manual process carried out by security experts. Even when potential vulnerabilities are detected, the experts must verify whether these detections are true security vulnerabilities or false positives.

Detections of security vulnerabilities can result in false positives and false negatives. A false positive, commonly called a "false alarm," is a detection that indicates a given condition has been fulfilled, when it has not, e.g., a security vulnerability reported by an automated software security testing tool. A false negative is where an automated software security testing tool may indicate that a certain condition failed, while it was successful.

SUMMARY

Embodiments relate to systems and methods to automatically verify detections of security vulnerabilities reported by an automated software security testing tool. When an automated software security testing tool detects security vulnerabilities, these detections are verified to determine whether they are true security vulnerabilities or false positives. This allows the automated software security testing tool to reduce the amount of false detections of security vulnerabilities by automatically verifying reported vulnerabilities.

In one embodiment, an application service request is parsed to identify an application service request parameter of the application service request. The application service request parameter is altered. The application service request is reconstructed to include the altered application service request parameter. The behavior of the application is analyzed while executing the reconstructed application service request to detect a security vulnerability. The detection of the security vulnerability is verified to eliminate false positives.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number correspond to the figure in which the reference number is first used.

Introduction

Described herein are systems and methods to automatically verify detections of security vulnerabilities reported by an automated software security testing tool. When the tool is about to report detections of security vulnerabilities, it is verified whether these detections are real or false positives. By providing the verification information, the embodiments reduce the resources required for software security testing. The resource reduction is achieved due to the automated verification process which allows omitting existing manual verification processes by security experts, thereby reducing resource requirements and time spent by security experts. In addition, the automated verification process enables automated software development and results in faster releases of software versions and new features. A description of security testing of software using runtime analysis may be found in U.S. Pat. Nos. 8,726,394 and 9,043,924, which are incorporated by reference in their entirety.

The system and processes disclosed herein utilize instrumentation and/or automatic debugging logic to monitor application traffic to detect particular patterns. The system is preferably applied to (but not limited to) application testing across a network, such as the Internet. An application herein refers to a client-server computer program in which the client (including the user interface and client-side logic) generates web traffic (e.g., HTTP traffic). For example, the application may be webmail, online retail sales, online auctions, wikis, instant messaging services, etc. The application may run in a Web browser or may be a desktop application. An example of an application that generates traffic without running in a Web browser is Microsoft Word, which can generate traffic when checking for updates. Some of the application functions may also be invoked by end-users or automated software. When a user accesses a web page or resource, that page may provide scripts and other services for a client device of the user, and the client device may include interaction elements and other components for further interacting with the application server via application service requests.

The runtime system environment may include sensors enabled on a frontend server, a backend server, or an interactive application security server. To test an application using the described method, a portion of the code of the application is executed. The application traffic is reconstructed and the inputs to the application are manipulated by a sensor to verify the detection of a security vulnerability. The sensor transmits the application service request to the servers from within the application process itself.

In one embodiment, an application service request is parsed to identify an application service request parameter of the application service request. The application service request parameter is altered. The application service request is reconstructed to include the altered application service request parameter. The behavior of the application is analyzed while executing the reconstructed application service request to detect a security vulnerability. The detection of the security vulnerability is verified to eliminate false positives.

Example Schematic Block Diagram of Runtime System Environment

Figure 1:
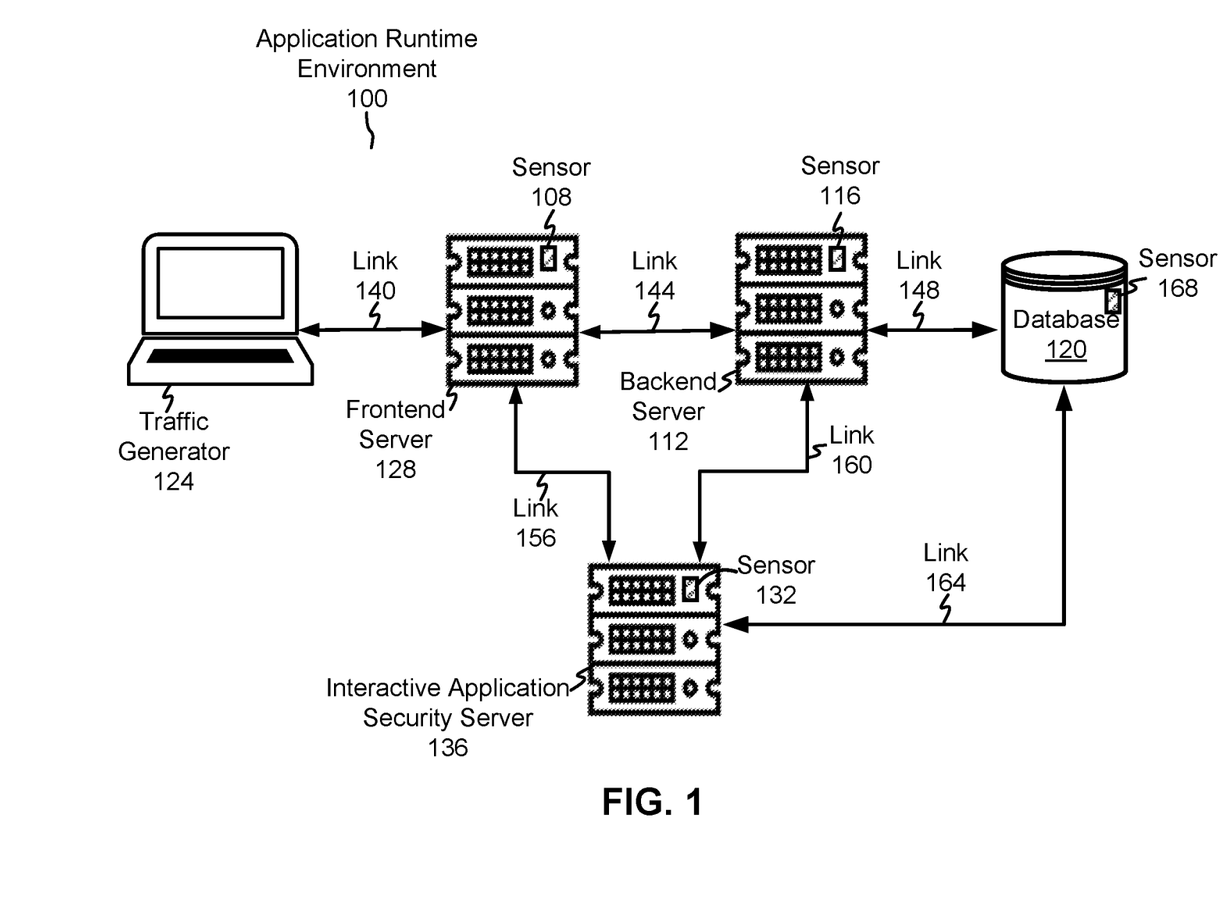
FIG. 1 is an example schematic block diagram of a runtime system environment for interactive verification of security vulnerability detections using runtime application traffic, in accordance with an embodiment.

FIG. 1 is an example schematic block diagram of a runtime system environment 100 for interactive verification of security vulnerability detections using runtime application traffic, in accordance with an embodiment. The runtime system environment 100 includes a traffic generator 124, a frontend server 128, a backend server 112, a database 120, and an interactive application security server 136. The runtime system environment 100 implements portions of a software application execution model. In one embodiment, the runtime system environment 100 includes a software environment in which programs compiled for a virtual machine implementation can run. In one embodiment, the runtime system environment 100 includes programs compiled into native code or scripted languages (e.g., JavaScript). The runtime system environment may include code necessary to run programs, dynamically link native methods, manage memory, and handle exceptions. In other embodiments, the runtime system environment 100 comprises additional or fewer components than those described herein. Similarly, the functions can be distributed among the components and/or different entities in a different manner than is described here.

The traffic generator 124 is a client-side electronic device used by a user to perform functions such as consuming digital content, executing software applications, browsing web sites hosted by or otherwise interacting with the frontend server 128 or backend server 112, and downloading files from the database 120. For example, the traffic generator 124 may be a smartphone or a tablet, notebook, or desktop computer. In addition, the traffic generator 124 may be an Internet-of-Things (IoT)-connected device such as a home appliance, or even another web server. The traffic generator 124 may include a display device on which the user may view digital content stored on the traffic generator 124 or downloaded from the database 120. In addition, the traffic generator 124 may include a user interface (UI), such as physical and/or on-screen buttons, with which the user may interact to perform functions such as consuming digital content, obtaining digital content, and transmitting digital content.

The traffic generator 124 transmits application service requests to the frontend server 128 via the communication link 140. The application service requests may seek to access a resource maintained, controlled, or otherwise accessible by the frontend server 128, backend server 112, or database 120. In one embodiment, the traffic generator 124 transmits application service requests using a network protocol, e.g., the Hypertext Transfer Protocol (HTTP) or a secure variant thereof. For example, a web browser on the traffic generator 124 may transmit an application service request to the frontend server 128 to fetch or post a file (e.g., a web page or an image). The application service request includes information identifying the requested resource and may also include information identifying the content to be posted, the traffic generator 124, the frontend server 128, and the session. For example, the request may include Internet Protocol (IP) addresses and port numbers of the traffic generator 124, frontend server 128, a path to the requested resource at the frontend server 128, and a cookie identifying the web browsing session.

The client-side traffic generator 124 enables the verification of security vulnerabilities in the runtime system environment 100 by generating and transmitting data packets over specific ports. In embodiments, the traffic generator 124 may also collect latency and jitter values, TX/RX rates, lost packet counts, and detect Out-of-Order (OOO) packets. An application in this context refers to logic executing from and in cooperation with an operating system (OS) of a device. The application is being executed at runtime by an application server, such as the backend server 112.

The communication link 140 enables communications among the traffic generator 124 and the frontend server 128. To this end, the communication link 140 receives application service requests and corresponding data (e.g., contents of a file to be posted on a web page) from the traffic generator 124 and forwards the application service requests to the frontend server 128.

The communication link 140 can comprise the Internet as well as mobile telephone networks. In one embodiment, the communication link 140 uses standard communications technologies and/or protocols. Thus, the communication link 140 can include links using technologies such as Ethernet, 802.11, Long-Term Evolution (LTE), etc. The networking protocols used on the communication link 140 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the communication link 140 can be represented using technologies and/or formats including the hypertext markup language (HTML), the extensible markup language (XML), etc. In addition, all or some of communication link 140 can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The frontend server 128 receives and processes application service requests from the traffic generator 124 and transmits responses back to the traffic generator 124. The frontend server 128 may perform asynchronous application service request handling, handle cross-browser compatibility issues, and execute a search engine. The frontend server 128 may receive application service requests and transmit them to other servers, such as the backend server 112, which performs the actual processing. In embodiments, the runtime system environment 100 may increase scalability by providing multiple frontend servers 128, accessing the same backend server 112 or a single frontend server 128 with multiple backend servers 112, where the frontend server 128 acts as a load balancer. The frontend server 128 includes a sensor 108 to monitor activities performed by the frontend server 128 and track data handled by the frontend server 128.

The backend server 112 performs functions such as application execution, database administration, data transformation, and backup. The backend server 112 may receive information entered into a Web site (using the frontend server 128) by the traffic generator 124, house the information in the database 120, and execute applications. The backend server 112 communicates with the frontend server 128 over a communication link 144, which similarly to the communication link 140 can comprise the Internet as well as mobile telephone networks. The communication link 144 may use standard communications technologies and/or protocols. The backend server 112 includes a sensor 116 to monitor activities performed by the backend server 112 and track data handled by the backend server 112.

The database 120 is an organized collection of data and may include a database-management system (DBMS) to interact with end-users via the backend server 112 and other applications. The database 120 may include an organized collection of schemas, tables, queries, reports, views, and other objects. The database 120 interacts with the backend server 112 to capture and analyze data, and allow the definition, creation, querying, update, and administration of application data. The database 120 may include any of MySQL, MongoDB, Microsoft SQL Server, Oracle, Sybase, SAP HANA, IBM DB2, etc. The database 120 communicates with the backend server 112 over a communication link 148, which similarly to the communication link 140 can comprise the Internet as well as mobile telephone networks. The communication link 148 may use standard communications technologies and/or protocols. The database 120 may include a sensor 168 to monitor activities performed by the database 120 and track data handled by the database 120.

The sensors 108, 116, and 168 may be deployed on any of the servers executing the code of the application. Each sensor is a software component that can inject code directly into the application without altering the application source files. The sensors monitor activities performed by the tested application components using runtime technologies. In embodiments, a sensor network may be used for environmental monitoring using the Web. The sensor network may describe a wireless sensor network architecture where the individual sensors act and coordinate as a whole. Each sensor (e.g., 108) may include hardware or software debugging logic, instrumentation logic (e.g., as implemented by a Java agent in Java-based applications), OS function hooks, or a combination of such technologies. The sensors track data handled by the application code and monitor its processing. No changes are needed to the original application source code files. The code is altered automatically, in memory, using the instrumentation technology. By using the instrumentation technology, the sensors may inject code at specific locations of interest (e.g. methods that execute Structured Query Language (SQL)). SQL is a domain-specific language designed for managing data held in a relational database management system or for stream processing in a relational data stream management system. Using information gathered by the sensors, a security analysis process determines whether or not the application has security vulnerabilities.

Each sensor (e.g., 108) may also include an internal traffic generator. The sensor injects code into the application process using instrumentation and/or debugging and includes a traffic generator and an application request parser. When an application service request arrives for processing on the frontend server 128 or the backend server 112, the (injected) sensor code monitors the application service request to determine that an HTTP request has arrived for processing and to understand its structure. The sensor analyzes the code execution using instrumentation and/or debugging. If a potential security vulnerability is detected, the HTTP request is reconstructed to alter one or more parameter values. The reconstructed request is transmitted to the application using the traffic generator within the sensor, i.e., from inside the application process. The application behavior is analyzed to observe how it handles the altered input. Finally, the potential security vulnerability is verified.

Each sensor (e.g., 108) may monitor an application service request (e.g., an HTTP request) delivered by the traffic generator 124 or one of the other servers (e.g., frontend server 128). The application service request may include the source IP address, port, and proxy, as well as the destination IP address, port, host and protocol. "Protocol" in this context refers to rules, procedures and formats that define communication between two or more devices, e.g., frontend server 128 and backend server 112. The application service request corresponds to an application state of the application and a protocol. The application state may include the identity of the user, the contents of a shopping cart for an Internet commerce application, the current step in a navigation flow of the application, a database connection string, etc. The application service request may further include a requested Uniform Resource Locator (URL), a user agent (browser) header, a referring Web page, cookies, cache control headers, and connection control headers.

The protocol may include form-based HTTP requests, multi-part submissions, JavaScript Object Notation (JSON), and/or Simple Object Access Protocol (SOAP). JSON is an open-standard file format using text to transmit data objects consisting of attribute-value pairs and array data types for asynchronous browser/server communication. SOAP is a protocol specification for exchanging structured information using the XML Information Set for its message format, and relying on application layer protocols, such as HTTP or SMTP for message negotiation and transmission.

Each sensor (e.g., 108) may monitor the inputs to the application (e.g., HTTP requests). The sensors monitor the activities that are performed by the application components (e.g., backend server 112) using runtime technologies. In embodiments, the monitored activities include SQL execution, Lightweight Directory Access Protocol (LDAP) queries, file system access, etc. SQL execution refers to parsing, optimization, row source generation, and execution of an SQL query. LDAP is a software protocol for enabling a user to locate organizations, individuals, and other resources such as files and devices in a network, whether on the public Internet or on a corporate intranet. File system access may be monitored to determine the identity of users and control the ability of the users to view, change, navigate, and execute the contents of the file system (e.g., database 120). For example, requests may be monitored to ensure that data in the database 120 is modified in a controlled manner to restrict access to a specific program using passwords stored in the metadata of the file or file permissions in the form of permission bits, access control lists, or capabilities.

The sensors (e.g., 108) may use instrumentation, debugging, OS function hooks, or a combination of such technologies. In embodiments, the sensors can track data handled by the application code and monitor its processing. Therefore, there is no need to change any of the original application source files. In embodiments, monitoring behavior of the application service request includes instrumentation by the sensor (e.g., 108) to inject code at specific locations of interest.

In embodiments, instrumentation techniques are used, and initial analysis similar to that described above is performed. Example metrics that may be used are the number of performed queries, errors, latency, and the number of in-progress requests. In embodiments, observed failures are logged and a counter is incremented when a failure is observed. When failures are reported, metrics such as representing the total number of attempts are reported as well, making the failure ratio easy to calculate. In embodiments, metrics such as the number of queued requests, the number of threads in use, the total number of threads, the number of tasks processed, and how long they took are used to track how long requests were waiting in the queue.

The interactive application security server 136 monitors the runtime environment 100 using information from the sensors (e.g., 108) and data-flow correlation to verify identified vulnerabilities to ensure that they are true security vulnerabilities. The interactive application security server 136 may also detect complex vulnerabilities and logical flaws not detectable by other technologies and approaches. The interactive application security server 136 communicates with the sensor 108 within the frontend server 128 over a communication link 156, which similarly to the communication link 140 can comprise the Internet as well as mobile telephone networks. The interactive application security server 136 communicates with the backend server 112 over a communication link 160. The interactive application security server 136 communicates with the database 120 over a communication link 164. The interactive application security server 136 includes a sensor 132 to monitor activities performed by the interactive application security server 136.

The interactive application security server 136 uses the sensors (e.g., 108) on the various components (e.g., 124) including sensor 132 to monitor and gather information from application service requests and application execution (e.g., via instrumentation of servlet and filter application programming interfaces (APIs) at runtime. The gathered information is used by the sensors (e.g., 108) to reconstruct the application service requests by reusing the existing application state to verify security vulnerability detections, rather than generating new states to accomplish the verification. For example, the sensor 108 may reuse the same cookies and same parameter values of the original application service request transmitted by the traffic generator 124. Information gathered on the application service traffic is used to "duplicate" the received application service request, and manipulate the values of the user-controlled input in the same application state originally provided by the application service request. Incoming inputs to the application (e.g., HTTP requests) are monitored, and each of the security vulnerability detections is verified. Detections of security vulnerabilities reported by the interactive application security server 136 are therefore verified while avoiding the challenge of reconstructing an application state.

A sensor (e.g., 108) may use an application service parser to parse the application service request to identify an application service request parameter of the application service request. "Parser" in this context refers to logic that divides an amalgamated input sequence or structure into multiple individual elements. Example hardware parsers are packet header parsers in network routers and switches. In one example, consider an application service parser for HTTP parameter parsing. An input to the sensor may be 'http://mysite.com/page?param1=value1&param2=value2&param3=value3.'

The parsed entities may include the domain ("mysite.com"), schema ("HTTP"), path ("/page"), and the parameters ("param1, value=value1"; "param2, value=value2"; and "param3, value=value3").

An application service request parameter describes the structure and contents of the application service request. For example an application service request parameter may be an HTTP version, a uniform resource identifier (URI), a date/time format, a character set, the content encoding, a media type, or a language tag. In this manner, the sensor (e.g., 108) determines the structure of the application service request parameters, reconstructs the application service request with the same application state but with manipulated parameter values, and retransmits the application service request to the listening port of the frontend server 128. The monitoring, reconstruction, and retransmission of the application service request to the frontend server 128 is performed within the sensor from the same process of the application since the sensor code is instrumented inside the application process.

In embodiments, wherein the protocol is not an HTTP-based protocol, the protocol is detected and parsed using a custom parser for the detected protocol. The custom parser may receive input data in the form of a sequence of tokens or program instructions and build a data structure in the form of a parse tree or an abstract syntax tree. In one embodiment, the custom parser may perform lexical analysis to produce tokens from a stream of input string characters, which are broken into small components to form meaningful expressions. In one embodiment, the custom parser may check whether the generated tokens form a meaningful expression. In one embodiment, the custom parser may determine the meaning and implications of the validated expression and take corresponding actions.

An application service request parameter may include a username at the end of an HTTP request. For example, submitting a form on a Web page, such as <form action=http://www.site.com/login><input type=text name="username"><input type=submit></form>, creates a browser request with the username parameter at the end, e.g., http://www.site.com/login?username=jones. Application service request parameters may be used to pass data in Asynchronous JavaScript and XML (AJAX) Web applications for interactive Web applications using XML, HTML, CSS, and JavaScript. Application service request parameters may be used in APIs designed to call a web service, pass parameters directly via a URL, or pass short pieces of data from a client to a server.

In embodiments, the interactive application security server 136 replaces the identified application service request parameter with an existing value using a servlet filter, which can intercept HTTP requests targeted at a Web application. A servlet filter can intercept requests for servlets, JSPs, HTML files, or other static content by implementing the javax.servlet.Filter interface. When an application service request arrives, it is intercepted by the servlet filter. The filter inspects the request URL, the request parameters, and the request headers, and alters the parameters. For example, the application service parameter username=jones in the HTTP request http://www.site.com/login?username=jones may be identified. The HTTP request is then reconstructed with the same parameter value as: http://www.site.com/login?username=jones. In embodiments, the identified application service request parameter is replaced with a changed value. For example, the HTTP request may be reconstructed with a changed parameter value as: http://www.site.com/login?username=robert. In embodiments, an additional parameter is added to the application service request parameter. For example, the HTTP request may be reconstructed with a changed parameter value as: http://www.site.com/login?username=jones&username=robert.

The interactive application security server 136 therefore alters the original input and generates a reconstructed application service request with the altered input information to transmit manipulated inputs to the application to determine whether protection exists in the application code. In one embodiment, the HTTP request is transmitted from inside the application process using the sensor code injected into the application process. Instrumentation is used to transmit the HTTP request by opening a communication channel to the application process and transmitting the HTTP request using this channel. In this manner, the process sends the request to itself, commonly (but not necessarily) using a loopback network adapter.

In one embodiment, the logic of the instrumented system (e.g., the frontend server 128) that copied the application service request object in memory is invoked, and the HTTP parameters are manipulated using the in-memory objects, thereby reducing the efforts of parsing of the application service requests but exchanging that for familiarity with existing request objects. Therefore, to verify the test coverage of the software application, an application service request delivered in accordance with a first protocol may be parsed and reconstructed.

The interactive application security server 136 reconstructs the application service request, such that the reconstructed application service request includes the altered application service request parameter and corresponds to the application state of the application. Information gathered from the application service request (e.g., HTTP traffic) is therefore used to "duplicate" the application service request and to alter values of the application service traffic while preserving the application state originally provided by the application service request. Thus, security vulnerability detections may be verified while overcoming the challenge of reconstructing the application state.

Different parts of the runtime environment 100 may be instrumented so the sensors can gather information about the processing of user controlled input. A servlet API may be instrumented in order to monitor entry points to the application (e.g., HTTP request processing made by servlet and filters API). When an HTTP request arrives to the monitored entry point, the user input is altered by instrumenting the code that handles the user input (e.g., string manipulation code).

The reconstructed application service request is transmitted to the frontend server 128 for execution of the application using the protocol corresponding to the application service request. False detections of security vulnerabilities may be observed when an automated software security testing tool running on the interactive application security server 136 or on one of the other servers (e.g., backend server 112) in the runtime environment 100 reports a vulnerability in an application; but when a security expert tries to validate the detection, it is resolved as a false finding, meaning there is no security vulnerability as claimed by the automated testing software. False detections in security tools (and in automated software testing tools) cause a significant overhead to application developers and as a result, a significant loss of time and money to the business (i.e., wasted time of experts and other employees) and loss of confidence in the software testing tool. Additionally, a high rate of false detections prevents the security testing tool to be used in automated processes, since the results it reports require further investigation (mostly done by security experts), and commonly creates a bottleneck when software application vendors would like to release a new version of their software (since the security tests take a lot of time and efforts).

The interactive application security server 136 uses a sensor (e.g., 108) to verify, based on the analysis of the behavior of the application, the detection of the security vulnerability to eliminate false positives. Hence, each detection of a security vulnerability provided by automated tools may be verified. The analysis of the behavior of the application is used to verify the detection of the security vulnerability. The monitored activities and the relevant information such as SQL queries and accessed file path/name/content are analyzed (locally or remotely in an enterprise server) to determine if the application has true security vulnerabilities. In embodiments, the application is monitored on both the frontend server 128 and backend server 112. If the two servers observe different behaviors, this information is used for debugging. The requests entering may be tracked to observe the following: the number of requests in progress, the last time a request was processed, number of responses sent out, how long each stage of a request took, the overall runtime, and the last time a request completed (successful or failed).

In embodiments, determining whether a detection of a security vulnerability is a detection of a true vulnerability and not a false positive includes determining whether the reconstructed application service request is handled without sanitization or limitation. Sanitization is the process of examining data containing tags and producing new data that preserves the tags that are designated as safe. For example, sanitization may be used to protect against cross-site scripting (XSS) attacks or remove potentially dangerous attributes such as the onclick attribute to prevent malicious code from being injected. When application service requests are handled, limits and quotas on the requests may be administered to protect the responding system from receiving more data than it can handle and to ensure an equitable distribution of the system resources.

When a user-controlled input (e.g., an HTTP parameter value) is handled without any sanitization or limitation, it may signal that a true security vulnerability exists. For example, when an unsafe HTML element is found to be left off a blacklist (e.g., if the blacklist is out of date), the effects of a security vulnerability will not be sanitized out of the HTML output; detection of the security vulnerability is thus verified as being a true vulnerability, i.e., not a false positive. Similarly, when a reconstructed application service request is handled without adhering to a limit or a quota, detection of the security vulnerability may be verified as being a true vulnerability.

In embodiments, determining whether a detection of a security vulnerability is a detection of a true vulnerability and not a false positive includes determining whether the altered application service request parameter is handled in an insecure manner by the application producing a detection of security vulnerabilities. For example, the sensors (e.g., 108) may instrument different sinks) of the runtime code (e.g., classes used in order to access/manipulate files) as well as vendor code (e.g., SQL database drivers, e.g., mysql jdbc). By instrumenting these sinks, the sensors may detect an altered user-controlled input being used as an input to sinks. As a result, the input being transferred to such sinks is capable of being manipulated, and an automated testing tool may therefore report a detection of a security vulnerability. However, if the altered user input goes through methods that validate the input (e.g., allowing only numeric characters or limiting the input length) and if the software does not concern such methods as validators, then the automated testing tool may produce a false positive (erroneous detection of a security vulnerability). Therefore, determining whether the altered application service request parameter is handled in an insecure manner can be used to verify whether a detection of a security vulnerability is a detection of a true vulnerability or a false positive.

In embodiments, the interactive application security server 136 uses OS function hooks to verify, based on an analysis of the behavior of the application, the detection of the security vulnerability to eliminate false positives. The OS function hooks are used to observe security vulnerabilities that seek to alter or augment the behavior of an operating system, of applications, or of other software components by intercepting function calls or messages or events passed between software components. OS function hooks may also be used for intercepting event messages before they reach an application, intercepting operating system calls in order to monitor behavior of the application, or modify the function of an application or other component. Thus, detection of security vulnerabilities may be determined to be true vulnerabilities or false positives by determining whether an altered application service request parameter is handled in an insecure manner by the application.

The interactive application security server 136 may transmit the results of verification of the detection of the security vulnerability to developer devices, third parties, client devices, automated software testing tools, etc. The interactive application security server 136 may transmit the results of verification of the detection of the security vulnerability to perform application security testing, quality testing, load testing, or bug testing. The embodiments may be used to provide dynamic application security testing to identify vulnerabilities in applications running in production. In one example, the interactive application security server 136 may use the embodiments to identify vulnerabilities in open-source and commercial code in third-party applications or to augment automated web application security testing. In one example, the interactive application security server 136 may use the embodiments for reducing security vulnerabilities and risks, improving security features, and functions such as authentication, encryption or auditing. In one example, the interactive application security server 136 may use the embodiments for integrating with the enterprise security infrastructure. In one example, the interactive application security server 136 may use the embodiments for load testing, i.e., comparing performance characteristics of multiple systems or system configurations, identifying bottlenecks in a system, or supporting a performance tuning effort. In one example, the interactive application security server 136 may use the embodiments to perform bug testing, e.g., monitoring and reporting errors in applications, performing backtraces, or collecting feedback directly from an application that is executing.

Example Process for Verification of Security Vulnerabilities

Figure 2:
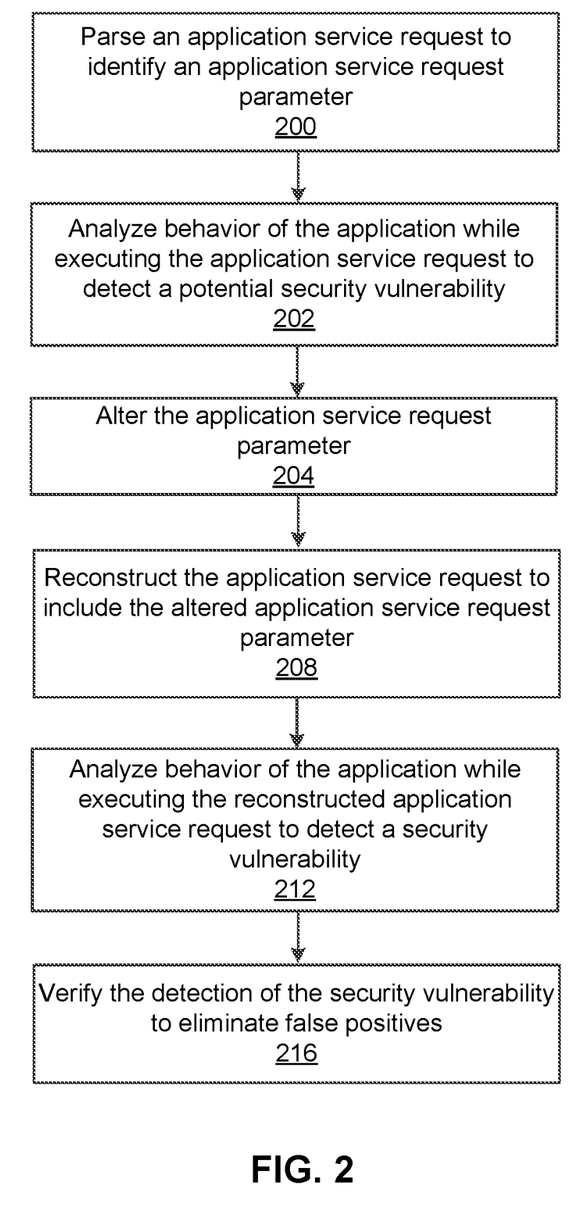
FIG. 2 is an example process for interactive verification of security vulnerability detections using runtime application traffic, in accordance with an embodiment.

FIG. 2 is an example process for interactive verification of security vulnerability detections using runtime application traffic, in accordance with an embodiment. In one embodiment, the process of FIG. 2 is performed by interactive application security server 136 using a sensor (e.g., 108). Other entities (e.g., frontend server 128 or backend server 112) may perform some or all of the steps of the process in other embodiments. In some embodiments, the process may have different and/or additional steps than those described in conjunction with FIG. 2. Steps of the process may be performed in different orders than the order described in conjunction with FIG. 2. Some steps may be executed in parallel. Alternatively, some of the steps may be executed in parallel and some steps executed sequentially. Alternatively, some steps may execute in a pipelined fashion such that execution of a step is started before the execution of a previous step.

The interactive application security server 136 uses the sensor 108 to parse 200 an application service request to identify an application service request parameter of the application service request. For example, an application service request may seek to access a resource maintained, controlled, or otherwise accessible by the frontend server 128, backend server 112, or database 120. An application service request parameter describes the structure and contents of the application service request.

The interactive application security server 136 uses the sensor 108 to analyze 202 behavior of the application while the application service request is being processed by the application and detect a potential security vulnerability. This detection triggers the application service request reconstruction to eliminate false positives.

The interactive application security server 136 uses the sensor 108 to alter 204 the application service request parameter by replacing the application service request parameter with an existing value, replacing the application service request parameter with a changed value, or adding an additional parameter to the application service request parameter.

The interactive application security server 136 uses the sensor 108 to reconstruct 208 the application service request to comprise the altered application service request parameter. The interactive application security server 136 therefore alters the original input and generates a reconstructed application service request with the altered input information to transmit manipulated data to the application to observe the behavior of the application.

The interactive application security server 136 uses the sensor 108 to analyze 212 the behavior of the application while executing the reconstructed application service request to detect a security vulnerability. The observed behavior and relevant information such as SQL queries and accessed file path/name/content are analyzed (locally or remotely in an enterprise server) to determine if the application has security vulnerabilities. Detections of security vulnerabilities may be generated based on the data analysis.

The interactive application security server 136 uses the sensor 108 to verify 216 the detection of the security vulnerability to eliminate false positives. The interactive application security server 136 may verify the detection of the security vulnerability by determining whether the altered application service request parameter is handled in an insecure manner by the application. The interactive application security server 136 may verify the detection of the security vulnerability by determining whether the altered application service request is handled without sanitization or limitation.

Example Schematic Block Diagram of Computing Device

Figure 3:
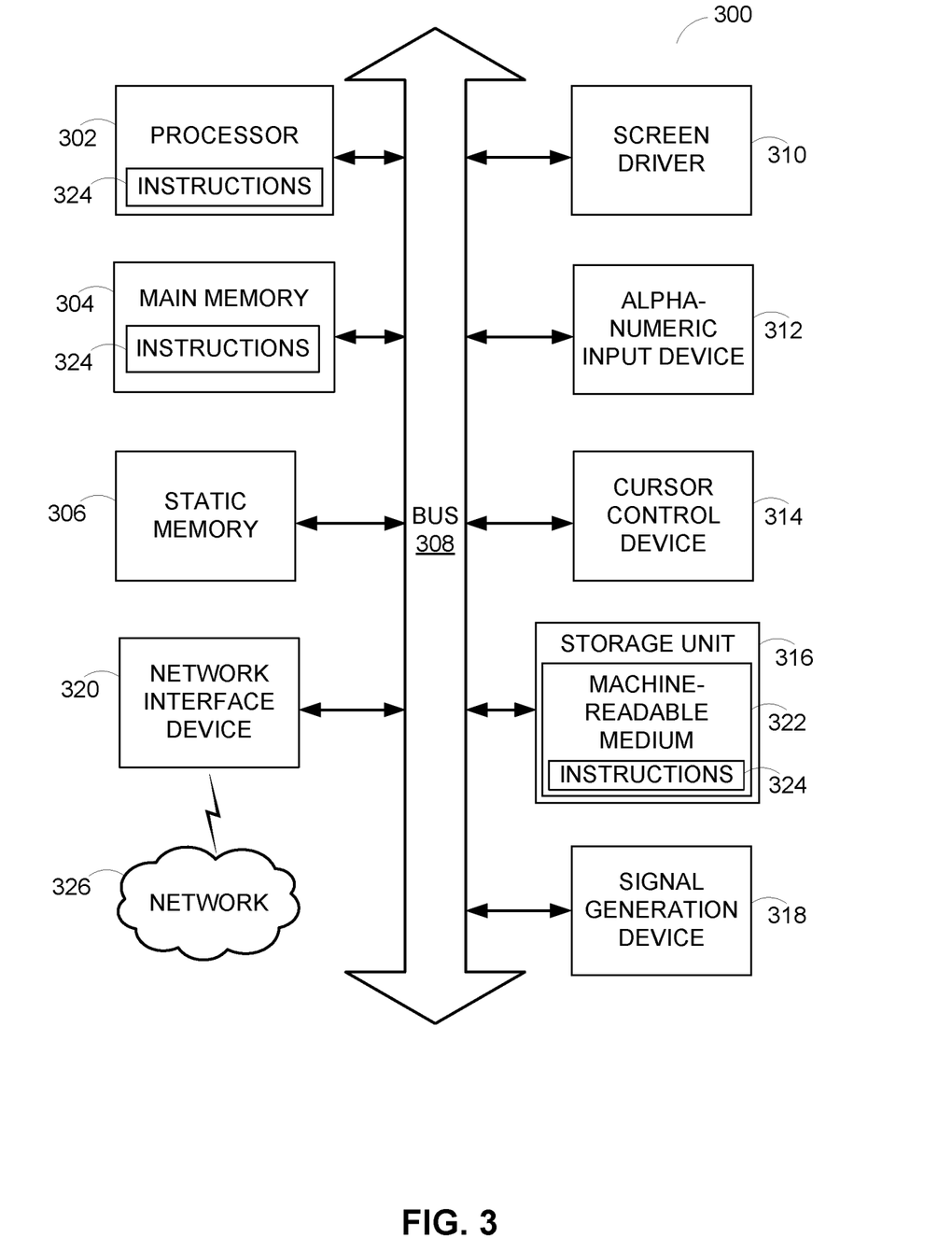
FIG. 3 is an example schematic block diagram of a computing device for interactive verification of security vulnerability detections using runtime application traffic, in accordance with an embodiment.

FIG. 3 is an example schematic block diagram of a computing device 300 for interactive verification of security vulnerability detections using runtime application traffic, in accordance with an embodiment. Specifically, FIG. 3 shows a diagrammatic representation of the computing device 300 in the example form of a computer system. The computer system 300 can be used to execute instructions 324 (e.g., program code or software) for causing the computing device 300 to perform any one or more of the methodologies (or processes) described herein. In alternative embodiments, the computing device 300 operates as a standalone device or a connected (e.g., networked) device that connects to other machines. In a networked deployment, the computing device 300 may operate in the capacity of a server machine or a client machine in a server-client network environment, or as a peer machine in a peer-to-peer (or distributed) network environment.

The computing device 300 may be a server computer, a client computer, a personal computer (PC), a tablet PC, a set-top box (STB), a smartphone, an internet of things (IoT) appliance, a network router, switch or bridge, or any computing device capable of executing instructions 324 (sequential or otherwise) that specify actions to be taken by that computing device. Further, while only a single computing device 300 is illustrated, the term "computing device" shall also be taken to include any collection of machines that individually or jointly execute instructions 324 to perform any one or more of the methodologies discussed herein.

The example computer system 300 includes one or more processing units (generally processor 302). The processor 302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 300 also includes a main memory 304. The computer system may include a storage unit 316. The processor 302, memory 304 and the storage unit 316 communicate via a bus 308.

In addition, the computer system 300 can include a static memory 306, a display driver 310 (e.g., to drive a plasma display panel (PDP), a liquid crystal display (LCD), or a projector). The computer system 300 may also include alphanumeric input device 312 (e.g., a keyboard), a cursor control device 314 (e.g., a mouse, a trackball, a joystick, a motion sensor, or other pointing instrument), a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store the instructions 324. The term "machine-readable medium" shall also be taken to include any medium that is capable of storing instructions 324 for execution by the computing device 300 and that cause the computing device 300 to perform any one or more of the methodologies disclosed herein. The term "machine-readable medium" includes, but not be limited to, data repositories in the form of solid-state memories, optical media, and magnetic media. Web applications are a prime target for attacks because they are the weakest security point for many enterprises.

Alternative Embodiments

In alternative embodiments, the methods and system disclosed herein may be used to strengthen the application layer by detecting security vulnerabilities that pose a real threat to critical data. In one embodiment, the interactive application security server 136 may be used to protect data from breaches. The runtime code and data-flow correlation may be used to verify the exploitability of each security vulnerability, determine the risk of each vulnerability, and provide remediation guidance to protect Web applications against attacks. The sensor 108 may be used for analyzing code as it runs, line by line, and monitoring the interaction of the code with sensitive data, across different application tiers and components. The sensor 108 detects the vulnerabilities, verifies them, and sends them to the interactive application security server. The sensor 108 may use a blend of dynamic testing and runtime code analysis to detect vulnerabilities, including complex vulnerabilities and logical flaws. The interactive application security server 136 is used to store the detections and present them to the user or integrate with other tools.

In one embodiment, the interactive application security server 136 may provide remediation guidance that enables a developer to fix issues, even if she doesn't have security expertise. When vulnerabilities are detected, the interactive application security server 136 may point to the vulnerable lines of code and suggest code fixes, context-based remediation instructions, and vulnerability classification based on risk and impact on data.

The advantages and benefits of the embodiments disclosed herein are that resource usage is reduced and Web applications may be tested in shorter development cycles, even for new code or as part of regression testing. The embodiments provide a solution that adapts to last-minute, frequent code changes to integrate quality and security testing.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1 and 3. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 302, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system and a process for identifying moving vehicles from low resolution imagery through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A method comprising:
   receiving information defining an application state of an application, the information including a current step in navigation flow of the application;
   receiving, using a protocol, an application service request, the application service request including identification of a requested action and an application service request parameter value associated with an application service request parameter;
   parsing, by an application service parser, the application service request to identify the application service request parameter of the application service request and the parameter value assigned to the application service request parameter;
   altering the application service request parameter by replacing the application service request parameter value with a different value;
   reconstructing the application service request, the reconstructed application service request comprising the different application service request parameter value and corresponding to the application state of the application;
   transmitting the reconstructed application service request to the application server for execution of the application using the protocol;
   analyzing behavior of the reconstructed application service request while executing the reconstructed application service request to detect a security vulnerability by determining whether the reconstructed application service request is handled in an insecure manner by the application server, wherein analyzing the behavior of the application is performed using instrumentation at specific locations of interest in the execution of the application;
   subsequent to determining, based on the analysis, that the reconstructed application service request is handled in an insecure manner by the application server, verifying whether the detection of the security vulnerability corresponds to a true vulnerability or a false positive; and
   transmitting the results of the verification of the detection of the security vulnerability.

2. The method of claim 1, wherein the reconstructing of the application service request is performed by injected code inserted into the application using instrumentation.

3. The method of claim 1, wherein the parsing of the application service request is performed responsive to detecting a potential security vulnerability while processing the application service request.

4. The method of claim 1, wherein the protocol comprises one or more of form-based HTTP requests, multi-part submissions, JavaScript Object Notation (JSON), and Simple Object Access Protocol (SOAP).

5. The method of claim 1, wherein the protocol is not an HTTP-based protocol, the method further comprising:
   detecting the protocol responsive to monitoring the application service request; and
   parsing the protocol using a custom parser for the detected protocol.

6. The method of claim 1, wherein the verifying of the detection of the security vulnerability comprises determining whether the altered application service request is handled without sanitization or limitation.

7. The method of claim 1, wherein the parsing of the application service request comprises instrumenting a servlet API to monitor entry points to the application.

8. The method of claim 1, wherein the analyzing of the behavior of the application comprises using one or more of debugging, instrumentation, and operating system (OS) function hooks.

9. The method of claim 1, applied to perform one or more of application security testing, quality testing, load testing, and bug testing.

10. A non-transitory computer-readable storage medium comprising instructions executable by a processor, the instructions comprising instructions for:
   receiving information defining an application state of an application, the information including a current step in navigation flow of the application;
   receiving, using a protocol, an application service request, the application service request including identification of a requested action and an application service request parameter value associated with an application service request parameter;
   parsing, by an application service parser, the application service request to identify the application service request parameter of the application service request and the parameter value assigned to the application service request parameter;
   altering the application service request parameter by replacing the application service request parameter value with a different value;
   reconstructing the application service request, the reconstructed application service request comprising the different application service request parameter value and corresponding to the application state of the application;
   transmitting the reconstructed application service request to the application server for execution of the application using the protocol;
   analyzing behavior of the reconstructed application service request while executing the reconstructed application service request to detect a security vulnerability by determining whether the reconstructed application service request is handled in an insecure manner by the application server, wherein analyzing the behavior of the application is performed using instrumentation at specific locations of interest in the execution of the application;
   subsequent to determining, based on the analysis, that the reconstructed application service request is handled in an insecure manner by the application server, verifying whether the detection of the security vulnerability corresponds to a true vulnerability or a false positive; and
   transmitting the results of the verification of the detection of the security vulnerability.

11. The non-transitory computer-readable storage medium of claim 10, wherein the reconstructing of the application service request is performed by injected code inserted into the application using instrumentation.

12. The non-transitory computer-readable storage medium of claim 10, wherein the analyzing of the behavior of the application comprises using one or more of debugging, instrumentation, and operating system (OS) function hooks.

13. The non-transitory computer-readable storage medium of claim 10, wherein the parsing of the application service request is performed responsive to detecting a potential security vulnerability while processing the application service request.

14. The non-transitory computer-readable storage medium of claim 10, wherein the protocol comprises one or more of form-based HTTP requests, multi-part submissions, JavaScript Object Notation (JSON), and Simple Object Access Protocol (SOAP).

15. The non-transitory computer-readable storage medium of claim 10, wherein the protocol is not an HTTP-based protocol, the instructions further comprising instructions for:
- detecting the protocol responsive to monitoring the application service request; and
- parsing the protocol using a custom parser for the detected protocol.

16. The non-transitory computer-readable storage medium of claim 10, wherein the verifying of the detection of the security vulnerability comprises determining whether the altered application service request is handled without sanitization or limitation.

17. The non-transitory computer-readable storage medium of claim 10, wherein the parsing of the application service request comprises instrumenting a servlet API to monitor entry points to the application.

18. The non-transitory computer-readable storage medium of claim 10, the instructions applied to perform one or more of application security testing, quality testing, load testing, and bug testing.

\* \* \* \* \*